US009043905B1

(12) United States Patent  
Allen et al.

(10) Patent No.: US 9,043,905 B1  
(45) Date of Patent: May 26, 2015

(54) SYSTEM AND METHOD FOR INSIDER THREAT DETECTION

(71) Applicant: HRL Laboratories, LLC, Malibu, CA (US)

(72) Inventors: David L. Allen, Thousand Oaks, CA (US); Tsai-Ching Lu, Wynnewood, PA (US); Eric P. Tressler, Calabasas, CA (US); Hankyu Moon, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/044,793

(22) Filed: Oct. 2, 2013

Related U.S. Application Data

(63) Continuation-in-part of application No. 13/747,477, filed on Jan. 23, 2013.

(60) Provisional application No. 61/589,646, filed on Jan. 23, 2012.

(51) Int. Cl.
| | |
|---|---|
| *H04L 29/06* | (2006.01) |
| *G06F 21/57* | (2013.01) |
| *G06F 12/14* | (2006.01) |
| *G06F 12/16* | (2006.01) |

(52) U.S. Cl.  
CPC ............ *H04L 63/1441* (2013.01); *H04L 63/20* (2013.01); *G06F 21/577* (2013.01)

(58) Field of Classification Search  
CPC ........ H04L 63/01; H04L 63/20; G06F 21/577

USPC ................................................ 726/22, 23, 25  
See application file for complete search history.

(56) References Cited

U.S. PATENT DOCUMENTS

| 8,595,834 | B2 * | 11/2013 | Xie et al. ........................ 726/23 |
| 8,745,737 | B2 * | 6/2014 | Thomas et al. ................. 726/22 |
| 2003/0236652 | A1 * | 12/2003 | Scherrer et al. .................... 703/2 |
| 2011/0167493 | A1 * | 7/2011 | Song et al. ...................... 726/23 |
| 2012/0284793 | A1 * | 11/2012 | Steinbrecher et al. .......... 726/23 |

OTHER PUBLICATIONS

Fountain et al., Taxonomy Induction Using Hierarchical Random Graphs, Jun. 2012, Association for Computational Linguistics, pp. 466-476.*

Xiong et al., Temporal Collaborative Filtering with Bayesian Probabilistic Tensor Factorization, 2010, SDM 10.*

(Continued)

*Primary Examiner* — Tae Kim  
*Assistant Examiner* — Louis Teng  
(74) *Attorney, Agent, or Firm* — Tope-McKay & Associates

(57) ABSTRACT

Described is a system for detecting insider threats in a network. In detecting the insider threat, the system receives data from the network relevant to network activity and extracts observable actions from the data relevant to a mission. The observable actions are combined to provide contextual cues and reasoning results. Based on the observable actions and reasoning results, proposed security policy updates are proposed to force insiders into using more observable actions. Finally, the system detects potential insider threats through analyzing the observable actions and reasoning results.

12 Claims, 17 Drawing Sheets  
(9 of 17 Drawing Sheet(s) Filed in Color)

(56) References Cited

OTHER PUBLICATIONS

Allen, D., Lu, T. C., Huber, D., & Moon, H. (2011). Hierarchical Random Graphs for Networks with Weighted Edges and Multiple Edge Attributes.*
CERT US Secret Service and Deloitte. 2010 cybersecurity watch survey. CSO magazine, 2010.
David Allen, Tsai-Ching Lu, and David Huber. Detecting and analyzing relationships among anomalies. In IEEE VAST, 2009.
Michael McCormick. Data theft: a prototypical insider threat. In S. Stolfo et al. (Ed.), Insider Attack and Cyber Security, pp, 53-680, Springer, 2008.
2006 E-Crime Watch Survey CSO Magazine with U.S. Secret Service, CERT Coordination Center, and Microsoft Corp.
Brian Bowen, Malek Ben Salem, Shlomo Hershkop, Angelos Keromytis, Salvatore Stolfo. Designing Host and Network Sensors to Mitigate the Insider Threat. IEEE Security and Privacy, pp. 22.29, Nov./Dec. 2009
Robert H. Anderson, Thomas Bozek, Tom Langstaff, Wayne Meitzler, Michael Skroch, and Ken Van Wyk. Research on mitigating the insider threat to information systems—#2, RAND Conference Proceedings, 2000.
D. Caputo, Maloof, and G. Stephens. Detecting the theft of trade secrets by insiders: a summary of MITRE insider threat research. IEEE Security & Privacy, Fall 2009.
Felicia Duran, Stephen H. Conrad, Gregory N. Conrad, David P. Duggan, and Edward Bruce Held. Building a system for insider security. IEEE Security and Privacy, pp. 30-38, Nov./Dec. 2009.
M. Keeney, E. Kowalski, D/ Cappelli, A. Moore, T. Shimeall, and S. Rogers. Insider threat study: computer system sabotage in critical infrastructure sectors. Joint SEI and U.S Secret Service Report, 2005.
Adam Barth, Benjamin Rubinstein, Mukund Sundararajan, John Mitchell, Dawn Song, and Peter Bartlett. A learning-based approach to reactive security. In Proc. of the 14th International Conference on Financial Cryptography and Data Security, 2010.
Ya'akov Gal and Avi Pfeffer. Networks of influence diagrams: a formalism for reasoning about agents' decision-making processes. Journal of Artificial Intelligence Research 33, pp. 109-147, 2008.
Gérard Wagener, Radu State, Alexandre Dulaunoy, and Thomas Engel. Self adaptive high interaction honeypots driven by game theory. In SSS '09: Proceedings of the 11th International Symposium on Stabilization, Safety, and Security of Distributed Systems, pp. 741-755, Berlin, Heidlberg, 2009, Springer-Verlag.
Changhe Yuan, Xiaolu Liu, Tsai-Ching Lu, and Heejin Lim. Most relevant explanation: Properties, algorithms, and evaluations. In Proceeding of the 25th Conference on Uncertainty in Artificial Intelligence (UAI 2009), 2009.
Aaron Clauset, Cristopher Moore, and M. E. J. Newman. Hierarchical strucuture and the prediction of missing links in networks. Nature, 453 (7191): 98-101, 2008.
B. Davison and H. Hirsh, Predicting Sequences of User Actions. AAAI-98 Workshop, 1998.
Steven McKinney. Insider threat: user identificaton via process profilling. Ph.D. thesis, NCSU, 2008.
N. Nguyen, P. Reiher, and G.H. Kuenning. Detecting insider threats by monitoring system call activity. IEEE Information Assurance Workshop, United States Military Academy West Point, New York, 2003.
Malek Ben Salem, Shlomo Hershkop, and Salvatore Stolof. A Survey of Insider Attack Detection Research, In S. Stolfo et al. (Ed.), Insider Attack and Cyber Security, pp. 69-90. Springer, 2008.
Mikhail Belkin and Partha Niyogi. Laplacian Eigenmaps for dimensionality reduction and data representation. In Neural Computation, vol. 15, 2003.
N. Marwan, M.C. Romano. M. Thiel, and J. Kurths. Recurrence plots for the analysis of complex systems. In Physics Reports, 438, 237-329.
Malek Ben Salem and Salvatore Stolfo. Detecting Masqueraders: A Comparison of One-Class Bag-of-Words User Behavior Modeling Techniques. In Proceedings of the Second International Workshop on Managing Insider Security Threats, 2010.
M. Scheffer, J. Bascompte, W.A. Brook, V, Brovkin, S.R. Carpenter, V. Dakos, H. Held, E.H. van Nes, M. Rietkerk, and G. Sugihara. Early-warning signals for critical transitions. Nature, 461, 53-59, 2009.
O. Kwon and J.-S. Yang. Information Flow between Stock Indices, 2008 EPL 82 68003.
M. Staniek and K. Lehnertz, Symbolic Transfer Entropy, Physical Review Letters 100, 15801, 2008.
M. Scheffer, J. Bascompte, W. A. Brock, V. Brovkin, S.R. Carpenter, V. Dakos, H. Held, E.H. van Nes, M. Rietkerk, and G. Sugihara, Early-warning signals for critical transitions. Nature, 461, 2009.
T. Schreiber, Measuring Information Transfer, Phys. Rev, Lett. 85, 461, 2000.
K.-Y. Ni and T.-C. Lu, Detection and Identification of Directional Influences using Information Dynamic Spectrum, Proceedings of the 4th Workshop on Information in Networks, 2012.
D. Cappelli, R. Trzeciak, and R. Floodeen. "The Key to Successful Monitoring for Detection of Insider Attacks," presented at RSA Conference 2010, Mar. 2010.
2010 CyberSecurity Watch Survey, www.cert.org/archive/pdf/ecrimesummary10.pdf.
T. Kolda and B. Bader. "Tensor Decompositions and Applications," in SIAM Review, Jun. 2008.
J. Sun, D. Tao, S. Papadimitriou, P. Yu, and C. Faloutsos, "Incremental Tensor Analysis: Theory and Applications," in ACM Transactions on Knowledge Discovery from Data, vol. 2, No. 3, Oct. 2008.
National Research Council. "Network Science," The National Academies Press. 2005.
Charles Pfleeger. Reflections on the Insider Threat. In S. Stolfo et al. (Ed.), Insider Attack and Cyber Security. pp. 5-15. Springer, 2008.
Malek Ben Salem, Shlomo Hershkop, and Salvatore Stolof, A Survey of Insider Attack Detection Research. In S. Stolfo et al. (Ed.), Insider Attack and Cyber Security, pp. 69-90. Springer, 2008.
Michael McCormick. Data theft: a prototypical insider threat. In S. Stolfo et al. (Ed.), Insider Attack and Cyber Security, pp. 53-66, Springer, 2008.
M. Scheffer, J. Bascompte W.A. Brock, V. Brovkin, S.R. Carpenter, V. Dakos, H. Hekl, E.H. van Nes, M. Rietkerk & G. Sugihara, Early-warning signals for critical transitions. Nature, 461: 53-59, 2009.
V. Dakos, E. H. van Nes, R. Donangelo, H. Fort and M. Scheffer (in press). Spatial correlation as leading indicator of catastrophic shifts. Theoretical Ecotogy, 2009.
J. A. Almendral and A. Diaz-Guilera, Dynamical and spectral properties of complex networks. New J. Phys. 9 187, 2007.
V. Guttal and C. Jayaprakash, Spatial vadance and spatial skewness: leading indicators of regimes shifts in spatial ecological systems, Theoretical Ecology, 2009.
P. N. McGraw and M. Menzinger, Analysis of nonlinear synchronization dynamics of oscillator networks by Laplacian spectral methods, Physical Review E 75, 2007.
L.M. Pecora and T.L. Carroll, Master Stability Functions for Synchronized Coupled Systems, Phys. Rev. Lett. 1998.
D. Harmon, M De Aguitar, D. Chinellato, D. Braha. R.R. Epstein, and Y. Bar-Yam, Predicting economic market crises using measures of collective panic, Arxiv.org, 2011.
Hankyu Moon and Tsai -Ching Lu, Early warning signal of complex systems: Network spectrum and critical transtions. In Workshop on Information in Networks (WIN), 2010.
H. Moon and T.-C. Lu, Network Catastrophe, Self-Organized Patterns Reveal both the Instability and the Structure of Complex Networks, preprint, 2012.
Hankyu Moon and Tsai-Ching Lu, Early warning signal of complex systems: Network spectrum and critical transtions. In Workshop on Information in Networks (WIN), 2010.
Michael McCormick. Data theft: a prototypical insider threat. In S. Stolfo et al. (Ed.), Insider Attack and Cyber Security, pp. 53-680, Springer, 2008.
Ya'akov Gal and Avi Pfeffer. Networks of influence diagrams: a formalism for reasoning about agents' decision-making processes. Journal of Artificial Intelligence Research 33, pp. 109-147, 2000.

(56) References Cited

OTHER PUBLICATIONS

Gérard Wagener, Radu State. Alexandre Dulaunoy, and Thomas Engel. Self adaptive high interaction honeypots driven by game theory. In SSS '09: Proceedings of the 11th International Symposium on Stabilization, Safety, and Security of Distributed Systems, pp. 741-755, Berlin, Heidlberg, 2009, Springer-Verlag.

Aaron Clauset. Cristopher Moore, and M. E. J. Newman. Hierarchical strucuture and the prediction of missing links in networks. Nature, 453 (7191): 98-101, 2008.

2010 CyberSecurity Watch Survey, www.cert.org/archive/pdf/ecrimesummay10.pdf.

J. Sun. D. Tao, S. Papadimitriou P. Yu, and C. Faloutsos, "Incremental Tensor Analysis: Theory and Applications," in ACM Transactions on Knowledge Discovery from Data, vol. 2, No. 3, Oct. 2008.

Michael McCormick. Data theft: a prototypical insider threat. In S. Stolfo et al. (Ed.), Insider Attack and Cyber Security, pp. 53-68, Springer, 2008.

\* cited by examiner

| Challenge | Present Invention Methodology |
|---|---|
| Early detection | Spectral EWS |
| Overcoming insider's knowledge | Reactive Security Strategies |
| Contextual mission modeling | Hierarchical dynamic Bayesian networks |
| Observation extraction | HRGs and tensor decomposition |

300 — (Challenge/Methodology header row)
302 — Overcoming insider's knowledge
304 — Contextual mission modeling
306 — Observation extraction

FIG. 3

| Ranked Observations | Diagnostic Value |
|---|---|
| C.1 | 0.199 |
| C.2 | 0.199 |
| C.3 | 0.199 |
| B.3 | 0.018 |
| A.1 | < 0.001 |
| A.3 | < 0.001 |
| B.1 | < 0.001 |
| B.2 | < 0.001 |
| A.2 | < 0.001 |

FIG. 9

SYSTEM AND METHOD FOR INSIDER THREAT DETECTION

CROSS-REFERENCE TO RELATED APPLICATIONS

This is Continuation-in-Part application of U.S. patent application Ser. No. 13/747,477, filed on Jan. 23, 2013, entitled, "System And Method For Insider Threat Detection," which is a non-provisional patent application of U.S. Provisional Application No. 61/589,646, filed on Jan. 23, 2012, entitled, "A system and method for cyber infrastructure protection from insider threats."

FIELD OF INVENTION

The present invention relates to a threat detection system and, more particularly, to a system for detecting, threats originating inside an organization.

BACKGROUND OF INVENTION

Cyber security research has developed significant capabilities for protecting against attacks originating externally (e.g., firewalls, intrusion detection systems, etc.); however, technology for protecting the cyber infrastructure from insiders is significantly weaker. The main emphasis on protecting against insider attacks has focused on developing security policies (e.g., physical security perimeters not allowing electronic devices in/out, stringent employee background checks and reviews etc.). In other words, most organizations still rely on perimeter network defenses to maintain security of their information. People working inside an enterprise are assumed to be working in the best interest of the organization and their behavior is guided by static security policies. However, attackers from inside an organization can exploit their access in ways that are subtle and extremely difficult to detect; for example, they may combine legitimate activities in such a way that the end result is no longer legitimate. The 2010 CyberSecurity Watch Survey (see the List of Cited Literature References, Literature Reference No. 1) points out that insiders commonly expose sensitive information or intellectual property, which in many cases are more costly and damaging than attacks originating from outside.

In another reference, it was pointed out that data leakage has emerged as the fastest growing insider attack (See Literature Reference No. 7). These issues were further investigated by McCormick, which presents recent events that have transpired that have driven a more intense look at insiders, such as reports from the Secret Service and CERT, highly publicized data thefts at major companies, and the financial services companies implementing data leak prevention programs (See Literature Reference No 5).

The focus on insider threats has lead to recent research by such groups as Columbia and others affiliated with I3P, RAND, MITRE, Sandia National Labs, and CERT (See Literature Reference Nos. 8-12, respectively). Most of the related work for detecting data leakage (or ex-filtration) can be categorized as either host-based user profiling or network-based sensors (See Literature Reference No. 22).

The host-based profiling techniques include Unix-style command line profiling, process profiling; and system call analysis (See. Literature Reference Nos. 19-21 respectively). They seek to determine the user's intent when issuing commands, "however most of this work failed to reveal or clarify the user's intent when issuing commands. The focus is primarily on accurately detecting change or unusual command sequences" (See Literature Reference No. 22). Therefore this can be helpful for low-level user profiling and for anomaly detection, but will be less applicable for high throughput analysis for detection of the masquerade ex-filtration mission where the mission can consist entirely of non-anomalous actions.

Two facets of network-based sensors approach are honey pots/honey tokens and network traffic monitoring. The first facet, honey pots and honey tokens, are computers or files which have no authorized usage and therefore any user accessing them is suspect. A key challenge is to make the honeypots and honey tokens appear realistic and non-detectable to the insider, because if the insider realizes their true nature they will simply ignore or circumvent them. Network traffic monitoring is focused on analyzing computer network traffic (either simply the packet header information or also content based analysis) in order to identify malicious network traffic.

Each of the prior methods discussed above exhibit limitations or only address part of the problem. Specifically, the prior art is not able to: (1) provide for early detection of insider behaviors; (2) overcome the detailed knowledge of the insider threat through reactive strategies; and (3) provide for robust detection of individual, legitimate activities that, when put together, become threatening.

Thus, a continuing need exists for a system that provides for a novel integrated approach for insider masquerade threat detection by leveraging early warning systems and reactive security strategies in conjunction with observation extraction and modeling techniques.

SUMMARY OF INVENTION

The present invention is directed to a system for detecting insider threats in a network. The system includes one or more processors and a non-transitory memory. The memory has executable instructions encoded thereon such that upon execution of the instructions, the one or more processors perform a variety of operations as described herein. By way of example, in detecting the insider threat, the system receives data from the network relevant to network activity and extracts observable actions from the data relevant to a mission. The observable actions are combined to provide contextual cues and reasoning results. Based on the observable actions and reasoning results, proposed security policy updates are proposed to force insiders into using more observable actions. The system also detects potential insider threats through analyzing the observable actions and reasoning results.

In another aspect, in receiving the data from the network, the data is a data type selected from a group consisting of network packet headers, access log files, communications, and output of other security measures.

In yet another aspect, in extracting observable actions, hierarchical random graphs (HRGs) are used to duster the data into normal patterns of activity and Bayesian Probabilistic Tensor decomposition (BPTD) is used to extract the observable actions from the patterns of activity.

Additionally, in combining the observable actions to provide contextual cues and reasoning results, the system uses dynamic Bayesian networks.

Further, in generating proposed security policy updates, the system uses game theoretic techniques to model interactions between potential insiders and current security policies to generate the proposed security policy updates.

In yet another aspect, in detecting potential insider threats, the system uses Spectral Early Warning Signals to detect transitions between normal usage and exfiltration usage.

Finally, the present invention also includes a computer program product and a method for performing the procedures described herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The objects, features and advantages of the present invention will be apparent from the following detailed descriptions of the various aspects of the invention in conjunction with reference to the following drawings, where:

FIG. 3 is a table illustrating four key challenges that arise when attempting to detect insider activities and the techniques employed by the present invention to address such challenges;

FIG. 9 is a table illustrating an example ranking of missing or noisy observables for differentiating mission scenarios;

DETAILED DESCRIPTION

Figure 1:
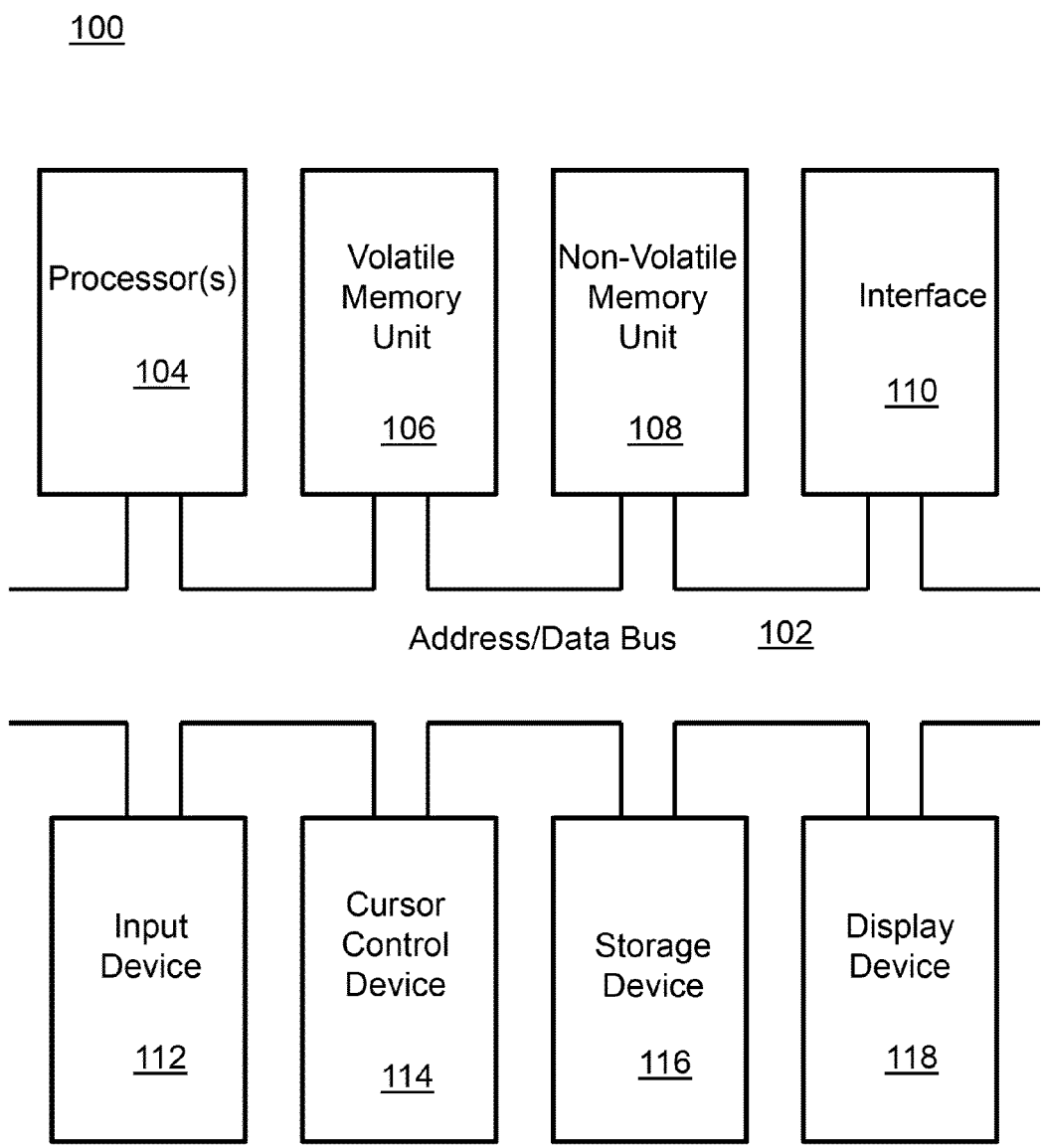
FIG. 1 is a block diagram depicting the components of an insider threat detection system of the present invention.

The present invention relates to a threat detection system and, more particularly, to a system for detecting threatening use by an insider in an organization. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public, inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of the present invention are provided to give an understanding of the specific aspects.

(1) LIST OF CITED LITERATURE REFERENCES

The following references are cited throughout this application. For clarity and convenience, the references are listed herein as a central resource for the reader. The following references are hereby incorporated by reference as though fully set forth herein. The references are cited in the application by referring to the corresponding literature reference number.

1. CERT US Secret Service and Deloitte. 2010 cybersecurity watch survey. *CSO magazine;* 2010.
2. Hankyu Moon and Tsai-Ching Lu. Early warning signal of complex systems: Network spectrum and critical transitions. In *Workshop on Information in Networks (WIN),* 2010.
3. U.S. patent application Ser. No. 13/029,073, filed on Feb. 16, 2011, and entitled, "System and Method for Modeling and Analyzing Data via Hierarchical Random Graphs."
4. David Allen, Tsai-Ching Lu, and David Huber. Detecting and analyzing relationships among anomalies. In *IEEE VAST,* 2009
5. Michael McCormick, Data theft: a prototypical insider threat. In S. Stolfo et al. (Ed.), *Insider Attack and Cyber Security,* pp. 53-680. Springer, 2008.

6. Insider Attack and Cyber Security. Editors: Salvatore Stolfo, Steven Bellovin, Shlomo Hershkop, Angelos Keromytis, Sara Sinclair, Sean Smith. Springer, 2008.
7. 2006 E-Crime Watch Survey CSO Magazine with U.S. Secret Service, CERT Coordination Center, and Microsoft Corp.
8, Brian Bowen, Malek Ben Salem, Shlomo Hershkop, Angelos Keromytis, Salvatore Stolfo. Designing Host and Network Sensors to Mitigate the Insider Threat. *IEEE Security and Privacy*, pp. 22-29. November/December, 2009
9. Robert H. Anderson, Thomas Bozek, Toni Longstaff, Wayne Meitzler, Michael Skroch, and Ken Van Wyk, Research on mitigating the insider threat to information systems—#2, *RAND Conference Proceedings,* 2000.
10. D. Caputo, M. Maloof, and G, Stephens. Detecting the theft of trade secrets by insiders: a summary of MITRE insider threat research. *IEEE Security & Privacy*, Fall 2009,
11. Felicia Duran, Stephen H. Conrad, Gregory N. Conrad, David P. Duggan, and Edward Bruce Held, Building a system for insider security, *IEEE Security and Privacy*, pp. 30-38, November/December, 2009.
12. M. Keeney, E. Kowalski, D/Cappelli, A. Moore, T. Shimeall, and S. Rogers. Insider threat study: computer system sabotage in critical infrastructure sectors. *Joint SEI and U.S. Secret Service Report,* 2005.
13, Judea Pearl. Probabilistic Reasoning in Intelligent Systems: Networks of Plausible Inference. Morgan Kaufmann Publishers, 1988.
14. Adam Barth, Benjamin Rubinstein, Mukund Sundararajan, John Mitchell, Dawn Song, and Peter Bartlett. A learning-based approach to reactive security. In *Proc. of the 14th International Conference on Financial Crytography and Data Security,* 2010.
15. Ya'akov Gal and Avi Pfeffer. Networks of influence diagrams: a formalism for reasoning about agents decision-making processes. *Journal of Artificial Intelligence Research* 33, pp, 109-147, 2008.
16. Gerard Wagener, Radu State, Alexandre Dulaunoy, and Thomas Engel. Self adaptive high interaction honeypots driven by game theory. In *SSS '09: Proceedings of the 11th International Symposium on Stabilization, Safety, and Security Distributed Systems*, pp. 741-755, Berlin, Heidelberg, 2009. Springer-Verlag,
17. Changhe Yuan, Xiaolu Liu. Tsai-Ching Lu, and Heejin Lim. Most relevant explanation: Properties, algorithms, and evaluations. In *Proceeding of the 25th Conference on Uncertainty in Artificial Intelligence* (UA1 2009), 2009.
18. Aaron Clauset, Cristopher Moore, and M. E. J. Newman. Hierarchical structure and the prediction of missing links in networks. *Nature,* 453 (7191): 98-101, 2008.
19. B. Davison and H. Hirsh. Predicting Sequences of User Actions. AAAI-98 Workshop, 1998.
20. Steven McKinney. Insider threat: user identification via process profiling Ph.D. thesis, NCSU, 2008.
21. N. Nguyen, P. Reiher, and G. H. Kuenning. Detecting insider threats by monitoring, system call activity. *IEEE Information Assurance Workshop,* United States Military Academy West Point, New York, 2003.
22. Malek Ben Salem, Shlomo Hershkop, and Salvatore Stolof, A Survey of insider Attack Detection Research. In S. Stolfo et al. (Ed.), *Insider Attack and Cyber Security*, pp. 69-90. Springer, 2008.
23. Mikhail Belkin and Partha Niyogi. Laplacian Eigenmaps for dimensionality reduction and data representation. In Neural Computation, vol. 15, 2003.
24. N. Marwan, M. C. Romano, M. Thiel, and J. Kurths. Recurrence plots for the analysis of complex systems. In Physics Reports, 438, 237-329.
25. Malek Ben Salem and Salvatore Stolfo. Detecting Masqueraders: A Comparison of One-Class Bag-of-Words User Behavior Modeling Techniques. In Proceedings of the Second International Workshop on Managing Insider Security Threats, 2010.
26. M. Scheffer, J. Bascompte. W. A. Brock, V. Brovkin, S. R. Carpenter, V. Dakos, H. Held, E. H. van Nes, M. Rietkerk, and G. Sugihara, Early-warning signals for critical transitions. Nature, 461: 53-59, 2009.

(2) PRINCIPAL ASPECTS

The present invention has three "principal" aspects. The first is an insider threat detection system. The insider threat detection system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of an insider threat detection system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM (PROW), erasable programmable ROM ("EPROM"), electrically erasable programmable ROM "EEPROM"), flash memory, etc.) coupled with the address/data bus 102, wherein the non-volatile memory unit, 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alpha-numeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The Computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
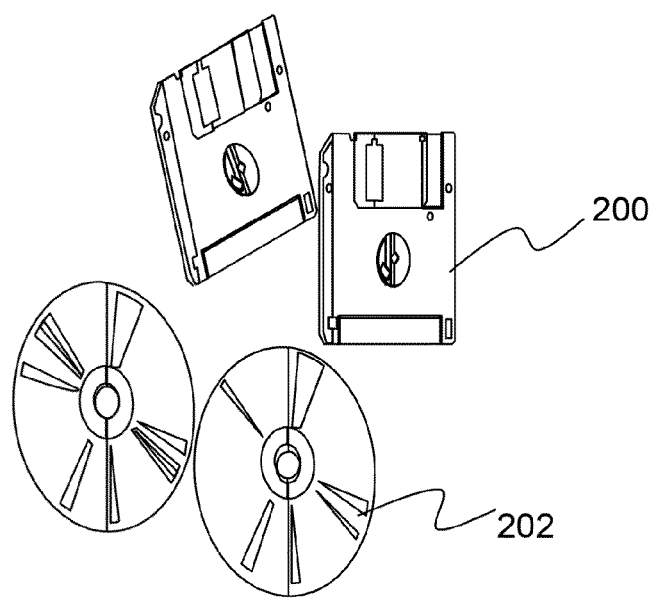
FIG. 2 is an illustration of a computer program product embodying the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(3) INTRODUCTION

Cyber security research has developed significant capabilities for protecting against attacks originating externally (e.g., firewalls, intrusion detection systems, etc.); however, technology for protecting the cyber infrastructure from insiders is significantly weaker. The main emphasis on protecting against insider attacks has focused on developing security policies (e.g., physical security perimeters not allowing electronic devices in/out, stringent employee background checks and reviews, etc.). Even with these policies there have been a number of recent high-profile cases of malicious insiders, both in government institutions as well as in commercial institutions.

Thus, in one aspect, the present invention is directed to detecting masqueraders attempting to exfiltrate information. A masquerader is someone who impersonates other users during their unauthorized activities. While differentiating insider threat activity from normal usage activity is very challenging, masqueraders do not know exactly how their victim uses the network resources, resulting in atypical usage patterns that can be detected very early in the attacker's mission. In addition, since insiders are already past the cyber infrastructure's perimeter defenses and have significant knowledge about security policies in operation, they will try to circumvent the known policies, making it more difficult to observe their behavior. In this case, reactive and dynamic security policies will improve observability and make the insider's mission harder.

As shown in the table of FIG. 3, four key challenges arise when attempting to detect insider activities. The first challenge (early detection 300) is to identify the mission prior to any significant damage being done. The second (overcoming insider knowledge 302) is the system's ability to overcome the insider's knowledge; as the insider has authorized privileges they are already past the perimeter defenses and have knowledge of the security policies which are in place. The third challenge (contextual mission modeling 304) is modeling the context of the actions since no single action will alert security policies of a possible insider threat, as the threat may completely consist of allowable actions; however, when these actions are placed into context an insider mission may be underway. The final challenge (observation extraction 306) is the ability to observe and detect actions from huge quantities of streaming and uncertain data.

In order to detect and mitigate insider threats before any significant damage is done, the present invention enables early detection of potential missions. This will enable security personnel to begin investigating and to potentially monitor related actions more closely. Hence the ability to detect the onset early is critical. In dynamical systems, early warning signals can enable an observer to detect when a system is approaching a critical transition, such as a bifurcation point. The present invention uses such early warning signals to detect and predict changes in the dynamical system defined by the users' interactions with the system to predict such changes.

To address the challenge, of overcoming an insider's knowledge, the present invention employs reactive security strategies. If the security policies are static and simply based on technologies such as access control lists, either the policies will be too restrictive for normal usage or the insider will be able to adapt and develop ways to get around those policies without being observed. This leads to the conclusion that adaptive or reactive security strategies may be beneficial for observing the insider. In these cases, the insider cannot easily know which policies are currently in effect at a specific instance, however the general user population is not dramatically affected adversely. One recent example of this is interactive honeypots, which are computers or portions of a file system with no authorized use, hence anyone using them is suspect; additionally interactive honeypots can try to gain information about the insider's actions and motives In differentiating authorized use from unauthorized use, it is necessary to deal with the uncertain observations and identify the context in which they occurred. One of the key strengths of probabilistic modeling, such as dynamic Bayesian networks, is a focusing on managing the uncertainty and integrating observations in a mathematically coherent way. Bayesian networks are founded on probability theory and have been successfully used in many domains to perform inference and reasoning across observations (see Literature Reference No. 13). To address the challenge of extracting observations, the system employs two techniques: 1) a hierarchical clustering method known as hierarchical random graphs (HRGs) and 2) Bayesian probabilistic tensor decomposition (BPTD) combined with social network analysis.

As such, the present invention is directed to a methodology and system for insider threat detection; specifically for detecting an insider masquerading as another user in order to exfiltrate data via network resources. The methodology uses emerging technologies for observing user behaviors, modeling the interaction between insiders and security policies, and for detecting critical system transitions. Specifically, the present invention provides for: (1) early detection of an insider threat's actions by exploiting a model-free dynamical system's spectral early warning signals (EWS) of critical transitions as network activity shifts from normal to adversarial actions; (2) increasing detection while decreasing false alarms by generating reactive security strategies using game theoretic modeling; (3) detecting a malicious insider's activities made up of individual legitimate actions by applying hierarchical random graphs (HRGs) to cluster relational data, such as user accounts and network resource accesses; and (4) mining huge quantities of streaming and uncertain data by combining probabilistic tensor decomposition and social network analysis.

This present invention is suited for monitoring a computer network to identify insiders masquerading as other users in order to exfiltrate information over the network. As can be appreciated by one skilled in the art, the system can be applied to defense and cyber security applications.

(4) SPECIFIC DETAILS OF THE INVENTION

Figure 4:
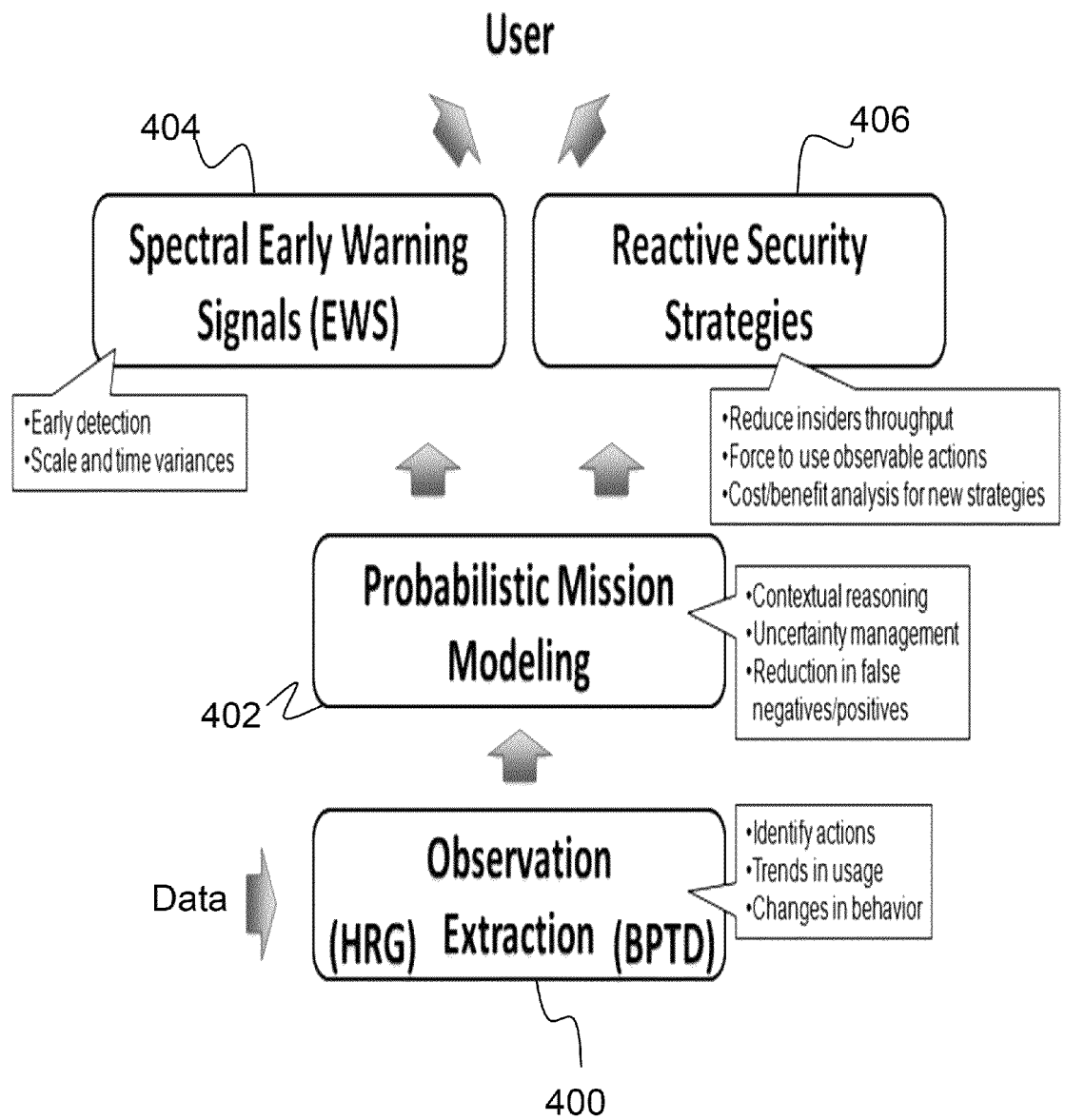
FIG. 4 is a flow chart depicting system architecture and benefits of each portion of the system.

To address these challenges, the present invention leverages a noveluses a combination of technologies comprising four modules, as depicted in FIG. 4. Specifically, these include Observation Extraction 400 through use of the HRG and BPTD, Probabilistic Mission Modeling 402, Spectral Early Warning Signals (EWS) 404, and Reactive Security Strategies 406 (e.g., game-theoretic reactive security strategies).

In the Observation Extraction Module 400, hierarchical random graphs (HRGs) are employed, to cluster relational data into normal patterns of activity. Bayesian Probabilistic Tensor Decomposition (BPTD) is employed to extract observations (i.e., observable actions) from multi-dimensional data, and social network analysis (SNA) to provide context with other observations. The HRG approach has two key advantages over other clustering techniques: it can predict missing links and detect superfluous links. An attacker's actions may not be severe enough for detection by anomaly detection routines, whereas the superfluous link detection will enable identification of actions occurring in the dataset that don't match the clusters of normal activity. These events will then be fed into the Probabilistic Mission Modeling Module 402 to add contextual information and improve detection performance.

The Probabilistic Mission Modeling Module 402 uses dynamic Bayesian networks to reason under uncertainty and coherently integrates noisy observations, which allows for reducing the number of false positives and false negatives. The Module 402 provides contextual reasoning that will improve identification of suspicious activities.

The Reactive Security Strategies Module 406 uses game theoretic techniques to model the interactions between potential insiders and the security policies to generate reactive security strategies. By modeling this interaction and applying relative values to specific actions, a cost/benefit analysis is developed to suggest new strategies, the goal of which is to make threatening insider behavior more difficult and detectable.

Dynamical systems modeling using the Spectral Early Warning Signals Module 404 enables early detection of critical transitions, as the insider starts switching between normal usage and ex filtration usage. EWS addresses the challenge of scale and time variances in adversary's mission. Early detection mitigates the risk of significant damage and alerts security personnel to investigate and further monitor behavior.

Figure 5:
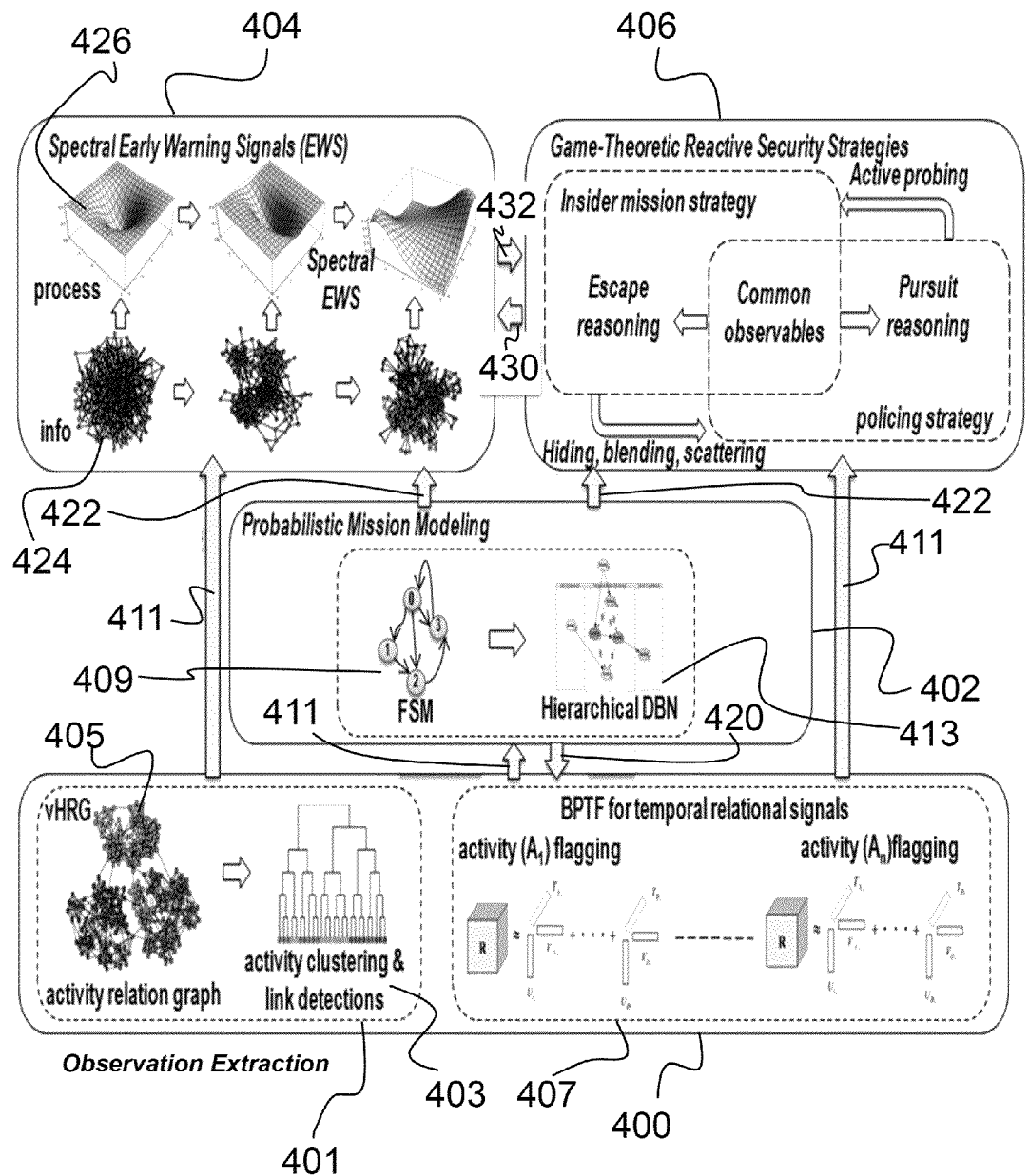
FIG. 5 is flow chart depicting system architecture of the present invention.

As a brief summary and also as illustrated in FIG. 5, the Observation Extraction Module 400 processes the input data, such as the network packet headers and access log files, and extracts out observable actions (observations) relevant to the mission. Other non-limiting examples of input data include communications (e-mails, chats, etc.), and outputs of other security measures (e.g. host-based profiling techniques). The Observation Extraction Module 400 then provides these observations to all three other modules. It should be understood that the term "observations" and "observable actions" can be used interchangeably according to the principles of the present invention.

The Probabilistic Mission Modeling Module 402 receives the observations and combines them to provide contextual information for reasoning. It passes contextual cues back to the Observation Extraction Module 400 and passes the reasoning, results to the other two modules. The Reactive Security Strategies Module 406 processes the observations and reasoning results to build game-theoretic models and propose updates to the current security policies to force insiders into using more observable actions. Finally, the Spectral Early Warning Signals Module 404 analyzes the observations and reasoning in order to provide early detection of potential insider threats. The subsequent sections will present the technologies encompassed by each of the modules.

(4.1) Observation Extraction Module

As noted above, the Observation Extraction Module 400 receives input data and then extracts actions (i.e., detects observables/observations 411) relevant to the mission. There are two main challenges in detecting observations 411 from data, which are: 1) discerning those observations 411 which are part of an insider threat and not part of normal usage, and 2) inferring observations 411 which cannot be directly or easily observed. In one aspect, the present invention uses two techniques to address such challenges.

The first technique is to employ a vectorized Hierarchical Random Graph (vHRG) module (see Literature Reference No. 3) 401, which is a useful tool for clustering nodes in network graphs 405 according to their connectivity; this data may include items such as network file access and the requesting account, in order to identify potential relationships of interest; these will then feed into a mission model 402 to put them in the context of other observations 411 to minimize false-negatives and false-positives. The vHRG module 401 employs Markov Chain Monte Carlo (MCMC) simulation methods to compute a population of binary trees, called dendrograms 403 (see Literature Reference No. 18) from the activity relation graphs 405. HRGs leverage probability theory in their clustering and provide the ability to detect 1) superfluous links (those which appear in the dataset but don't match the clustering) and 2) missing, links (those which are not in the dataset but have high likelihood based on the clustering).

Figure 6:
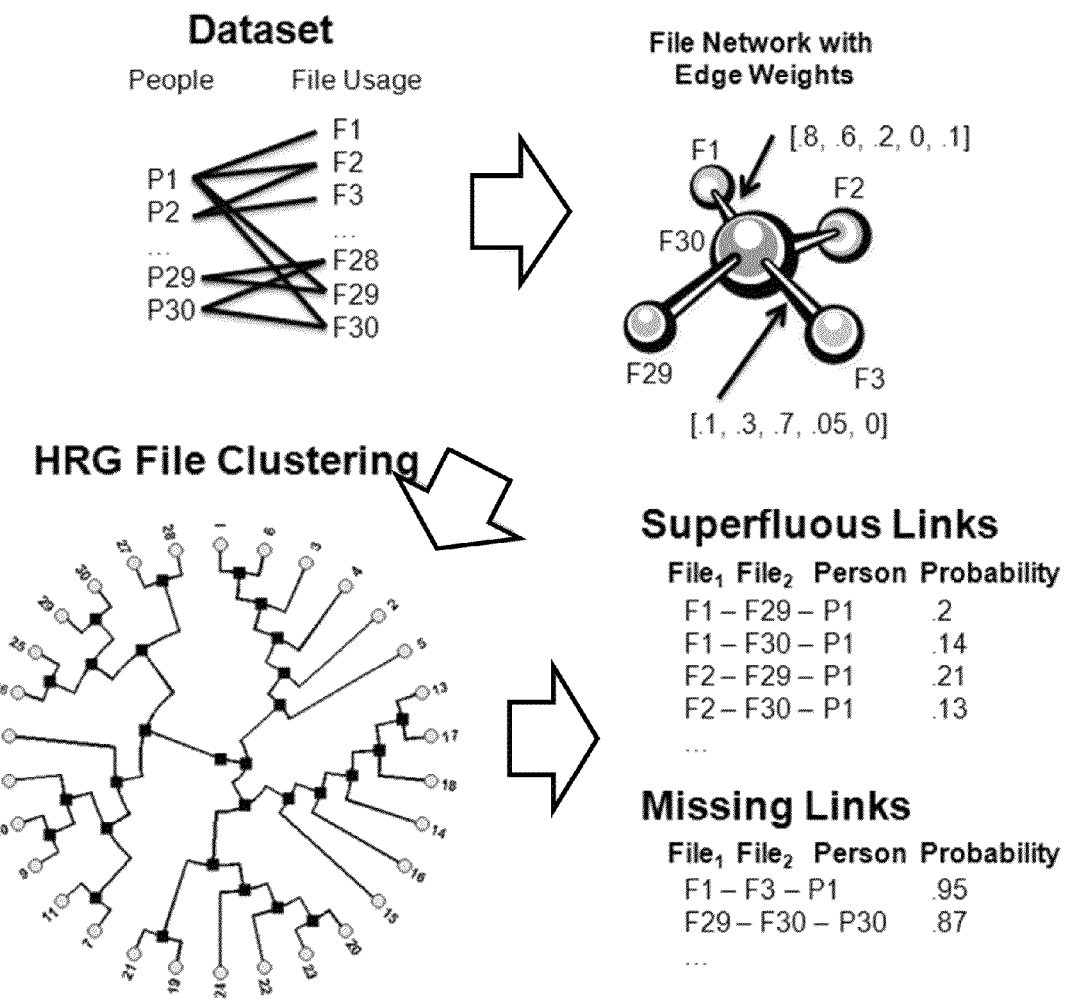
FIG. 6 is an illustration of dataset that is mapped to a weighted network for HRG clustering, which allows the system to detect potential superfluous and missing links in the data.

For example, FIG. 6 depicts a scenario of 30 people who work on 30 files, corresponding to 5 distinct projects. The vHRG algorithm was provided with the user access logs (i.e., with no knowledge of the projects or potential insider). Its clustering was able to correctly detect the association between the files and projects (with no prior knowledge or usage of the directory structure). Thus, using the probability theory with the vHRG allows for the ability to detect missing and superfluous links and, thereby, potential insider activities.

The vHRG algorithm is a clustering algorithm that computes the clusters, which, as a result, allows a user or the system to identify elements which are observed in the dataset but that do not match the cluster or for those not in the dataset but that have high likelihood (i.e., using probability theory as noted above) based on the clustering. For example, if the system were analyzing data, it may identify people accessing files which they typically would not be accessing based on normal usage; however, such access is not necessarily wrong, just a bit uncommon. If they just did this a small amount it may be part of their task, but if they were observed as accessing a lot of such logs it could be that they are collecting information in order to later ex-filtrate it.

The system also uses Bayesian probabilistic tensor factorization (BPTF) 407, in conjunction with social network analysis to monitor network traffic headers and physical employee access to identify insider actions. Tensors are high-dimensional generalizations of matrices and tensor decomposition is a multi-linear algebra-based technique which extracts low-dimensional features from high-dimensional datasets; it can be thought of as a high-dimensional principal component analysis (PCA).

For example, a combination of tensor decomposition, probabilistic rules, and domain knowledge can be used to extract out anomalies and other actions which, when combined with contextual information using social, network analysis allows for the identification of insider threats. For further illustration, FIG. 7A illustrates a depiction of a subset of the raw data, while FIGS. 7B through 7E illustrate outputs from the system according to the principles of the present invention.

Figure 7A:
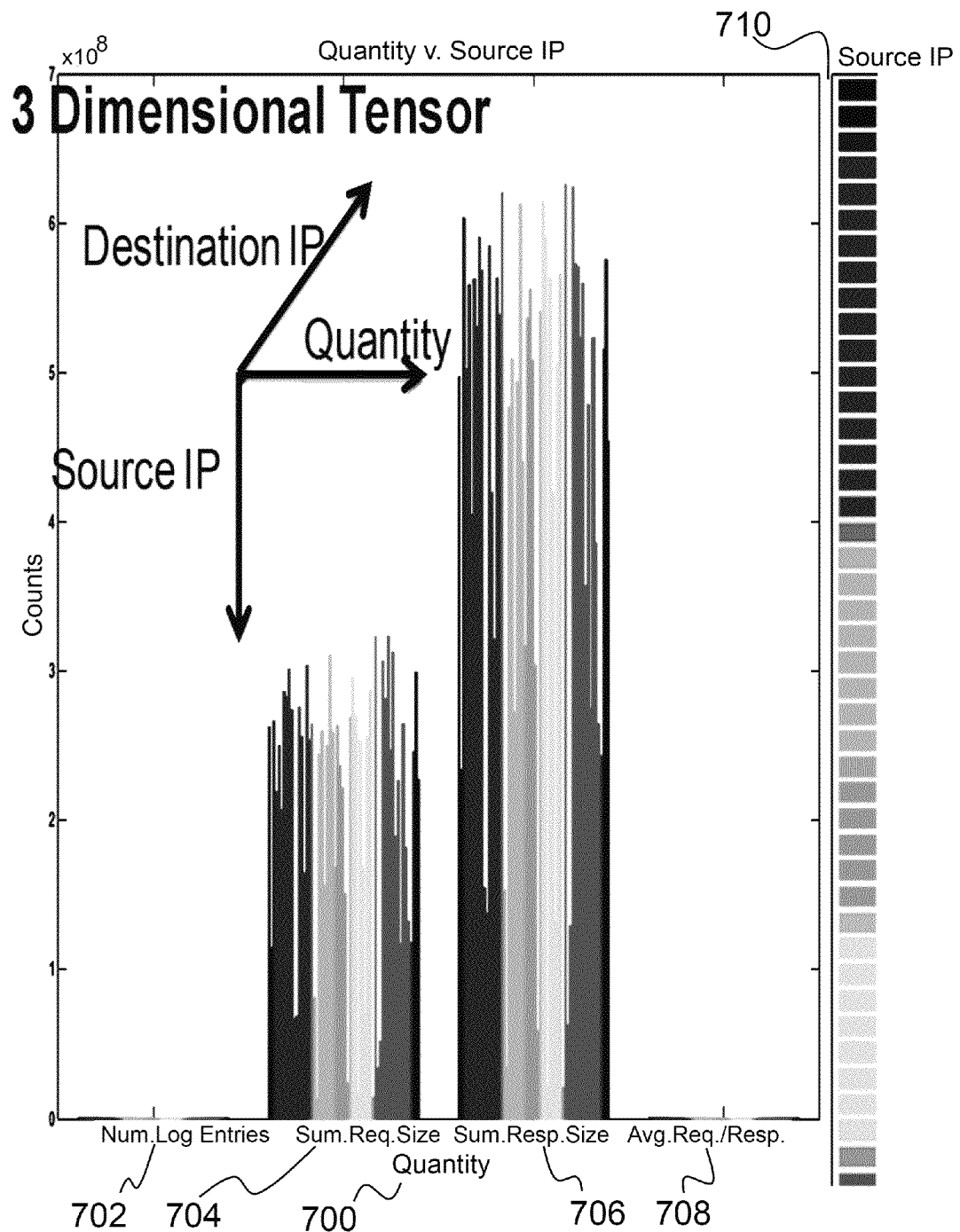
FIG. 7A is a chart depicting a subset of raw data.

Specifically, FIG. 7A provides an example of a three-dimensional tensor model, with the figure visualizing two of those dimensions (summing out the third dimension). The three dimensions are from the computer network traffic dataset and include Source IP, Destination IP, and Quantity. In the figure, the quantity 700 is displayed along the bottom of the figure (it contains four groupings of quantity values: number of packets 702, amount of information sent 704, amount of information received 706, ratio of sent/received 708). For each of the groupings the colored bars (shown in the figure legend) represent the Source IP 710, and the height of the bars represents the values (as counts). For example, each column in the first grouping shows the total number of network packets for a specific Source IP computer, the second grouping shows the amount of information sent from each computer, etc.

Figure 7B:
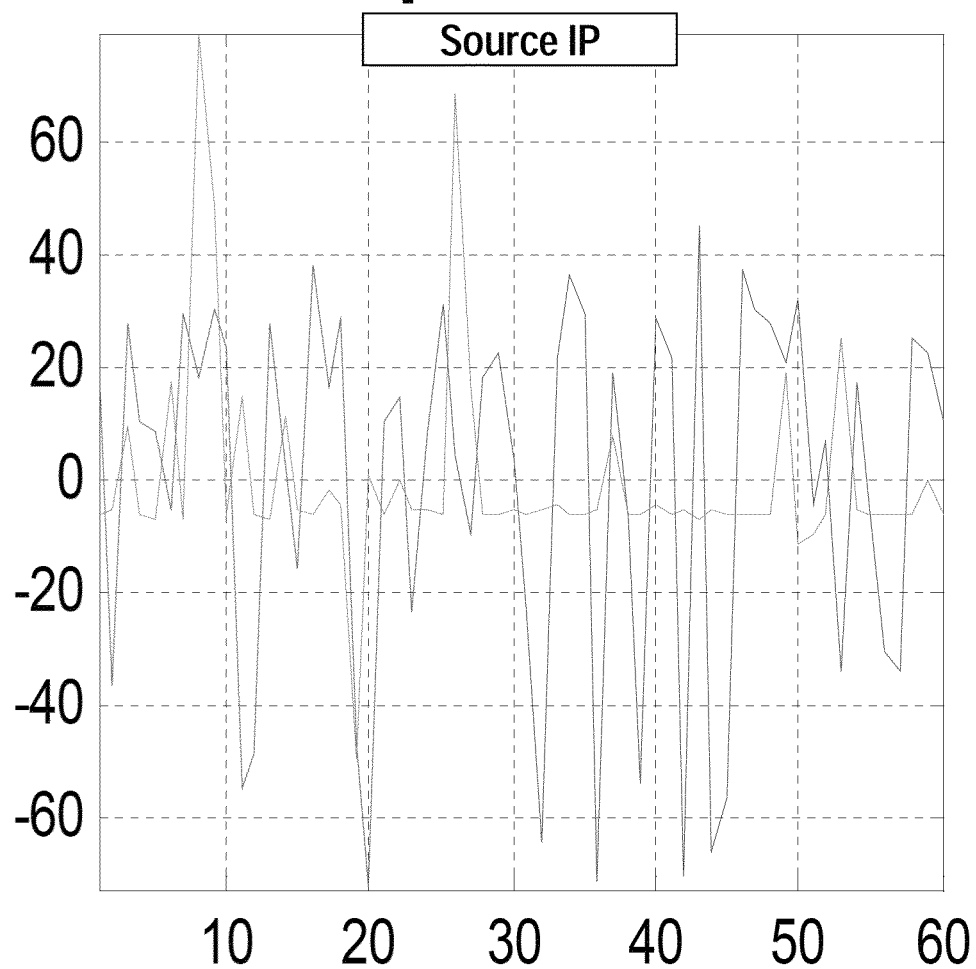
FIG. 7B is a Source IP data plot.
Figure 7C:
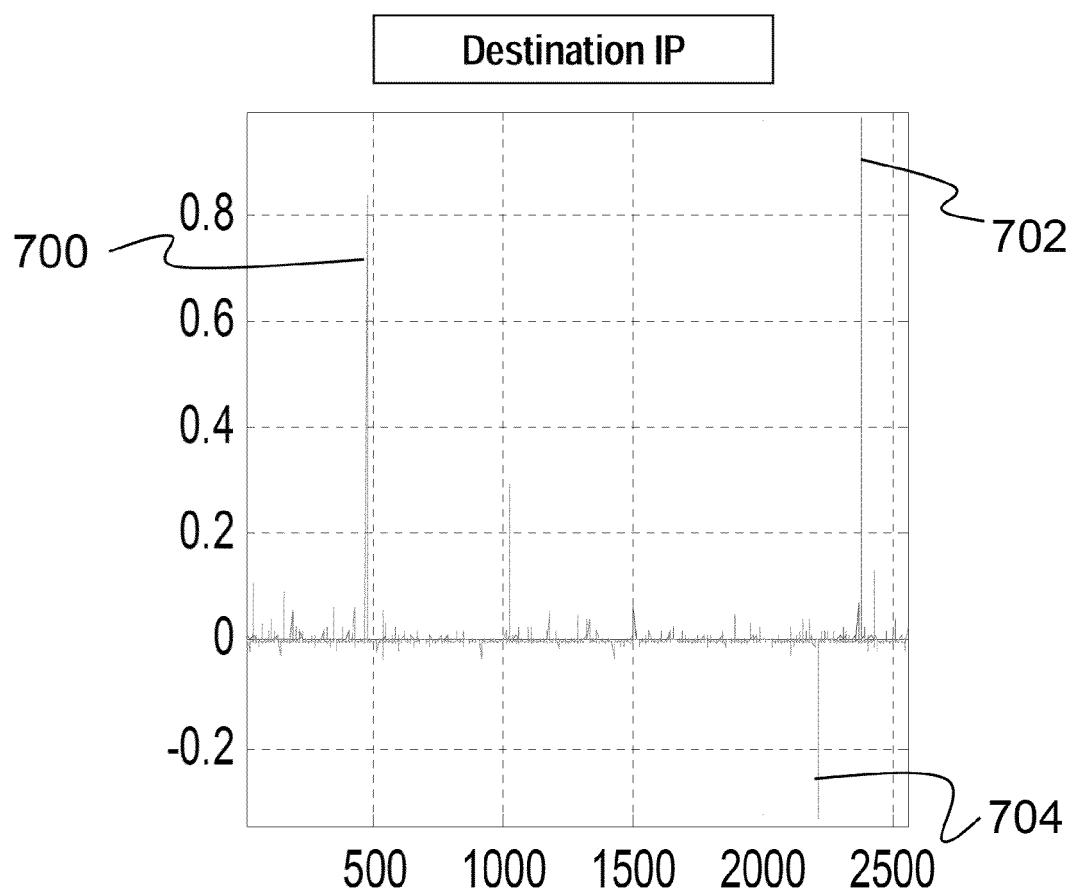
FIG. 7C is a Destination IP data plot.
Figure 7D:
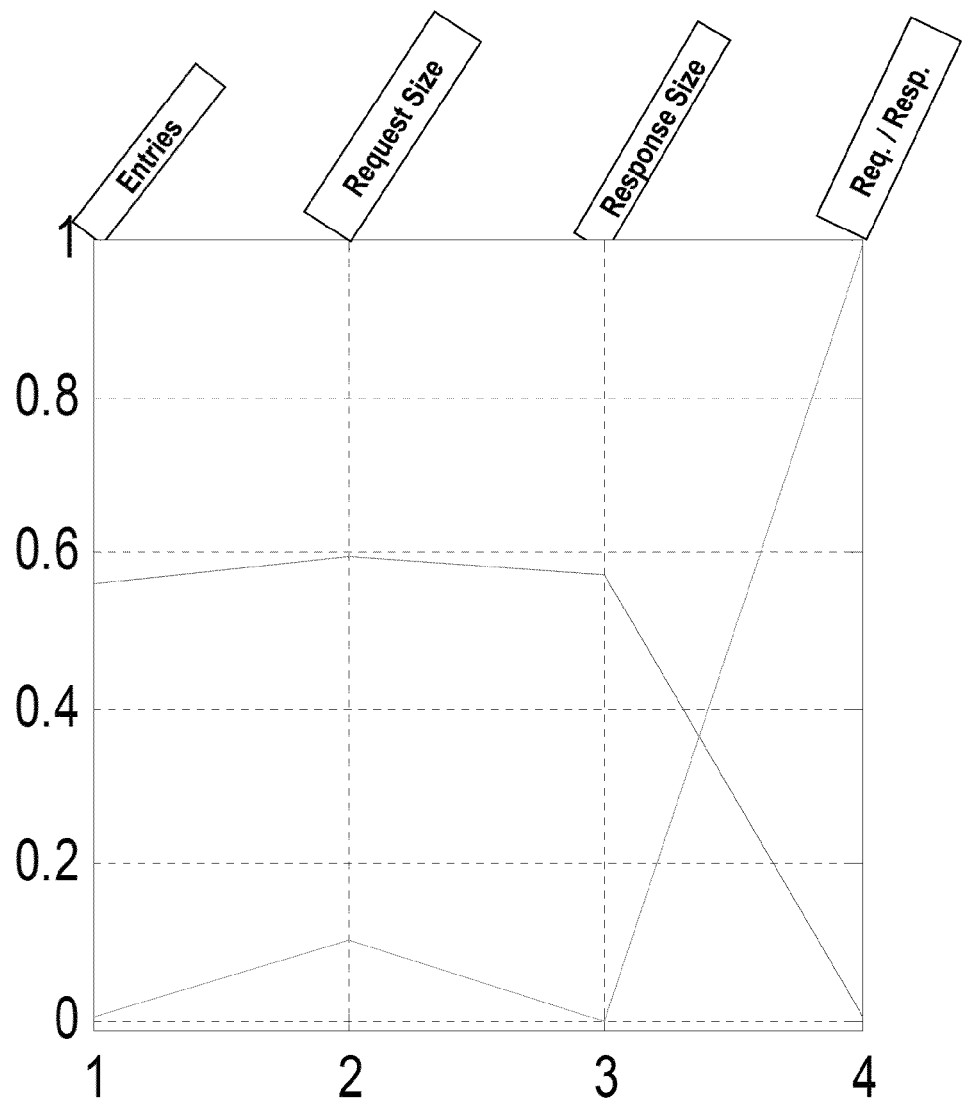
FIG. 7D is a Quantity data plot.

FIGS. 7B through 7D provide plots of a two component model showing the contribution of the SourceIP, DestinationIP, and Quantity dimensions. The SourceIP, DestinationIP, and Quantity dimensions can be used to extract actions and observables, which are then combined using social network analysis as shown in FIG. 7E).

For further understanding. FIGS. 7B through 7D provides results of tensor decomposition as learned from the data as presented in FIG. 7A. The original dataset (of FIG. 7A) has three-dimensions, which are represented by each of the three plots as presented in FIGS. 7B through 7D. Specifically, FIG. 7B includes a Source IP data plot. FIG. 7C is a Destination IP data plot, and FIG. 7D is a Quantity data plot. In the Source IP data plot (i.e., FIG. 7B), the x-axis reflects computers within the organization and the y-axis is the value learned by the decomposition, while in the Destination IP data plot (FIG. 7C), the x-axis reflects destinations of network traffic and the y-axis is the value learned by the decomposition. Finally, in the Quantity data plot (FIG. 7D), the x-axis is a number of log entries, request size, response size, and ratio (elements 702, 704, 706, and 708 from FIG. 7A) and the y-axis is the value learned by the decomposition.

Figure 7E:
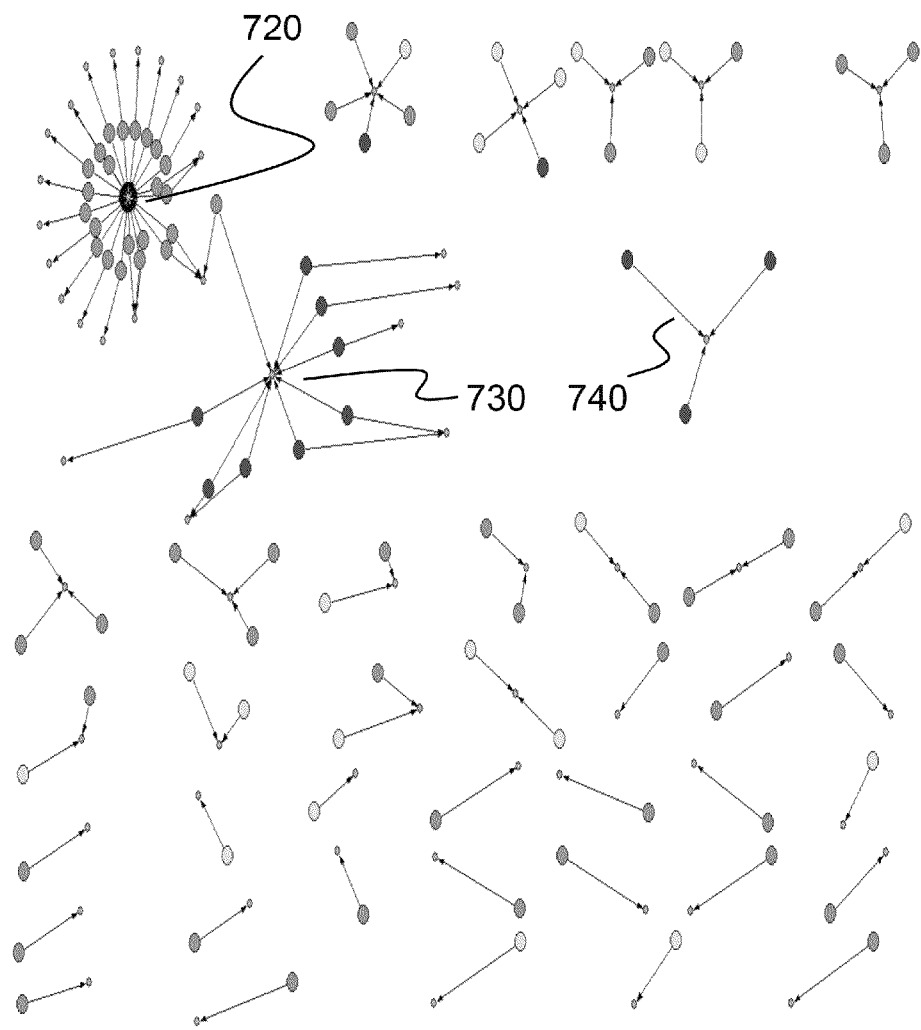
FIG. 7E is an illustration of network analysis.

As shown in FIG. 7E, the red, yellow, and green nodes represent actions (colored by their severity) and the small blue nodes represent attributes. In this non-limiting example, red indicates a more severe action while green is a benign action, with yellow being indicative of an action of intermediate severity. Examining the clusters of actions with common attributes is very informative. For example there is a large cluster of green actions 720 in the upper left with a common destination IP address (an internal network server). However below that is a cluster of red (severe) actions 730 with a common destination IP (these turn out to be a subset of the insider's actions). To the right of that is another cluster of three red actions 740 with a common employee (which turns out to be the insider). Using the HRGs and tensor decomposition, observations and actions are extracted from the data. These observations are then passed into the other modeling and detection modules in order to provide more detailed contextual information.

(4.2) Probabilistic Mission Modeling Module

To address the challenges of noisy and missing observables, and non-deterministic state transitions, hierarchical dynamic Bayesian networks (DBN) 413 are used, which take in observed soft evidence and reason about missing observables and the status and stages of the mission; they also recommend which pieces of evidence should be further investigated to discern the true nature of the mission. The DBN 413 represents the mission, modeling its hierarchical dimensions and activities, such as its partial ordering which can be modeled as a finite state machine (FSM) 409 and then integrated into the DBN 413. Extending the Most Relevance Explanation framework (see Literature Reference No. 17) for DBN 413, the likelihoods of potential mission scenarios are ranked to explain the observed evidence. Furthermore, predictive future distributions enable recommendations of what to investigate refute or strengthen the mission identification.

Figure 8:
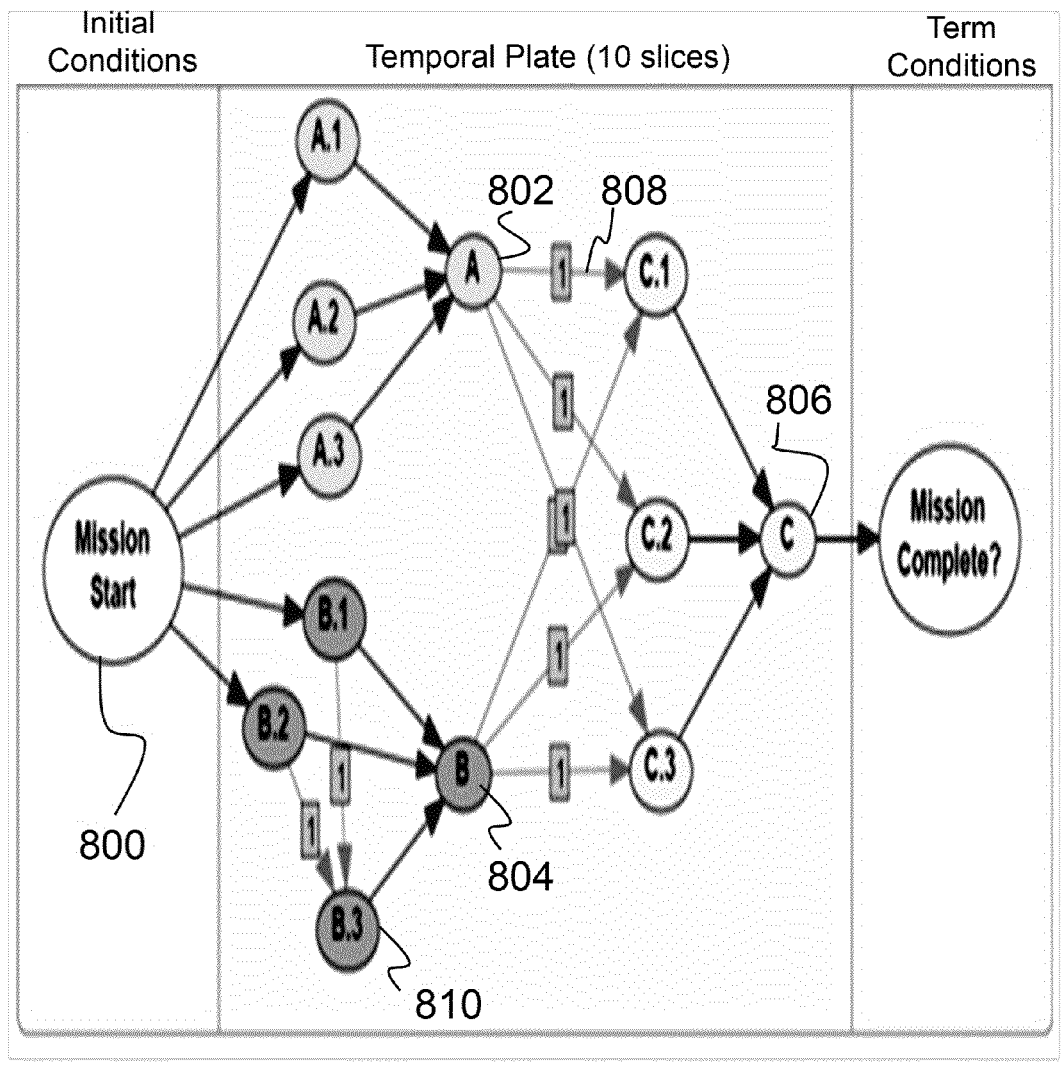
FIG. 8 is a schematic of a hierarchical dynamic Bayesian network for Masquerade Exfiltration Detection, illustrating that the likelihood for the stages of insider missions (A, B, C) is computed by a belief update given soft evidence on activity nodes.

An example hierarchical dynamic Bayesian network is shown (in FIG. 8) which can capture the state transitions for insider missions. Each node in the model is associated with a conditional probability distribution, given the configuration of their parent nodes. For example, the initial condition "Mission Start" 800 can be considered as soft evidence obtained via employee monitoring, which may not warrant hard evidence on insider threats, but it can raise the level of alerts for detecting insider activities. The node (A) 802 represents "Identification of Data for Extraction" and (B) 804 is the "Prepare for Masquerade Exfiltration" tasks of the mission which can be done in parallel, and both have to precede (C) 806, the actual "Cyber Exfiltration". The constraints on such task ordering are modeled as temporal arcs 808 where the tail nodes (e.g., A) have to precede the head nodes (e.g. C1) in actual sequence of mission executions. Nodes with incoming temporal arcs (e.g., 810 as a node with an incoming temporal arc), where temporal orders are shown on the edge, are associated with probability distribution of state transitions. Other arcs represent relevant relations between individual activities and mission domain, governed by associated conditional probability distribution; for example. A is considered completed if either A.1 or A.2 or A.3 is executed. The probability distribution required for the model is first elicited from expert knowledge and later updated according to data with Bayesian learning.

To infer the likelihoods for the stages of insider missions, the hierarchical DBN model is used by tracking potential warnings as soft evidence via constantly monitoring of employees' activities. Because observables are noisy and sometimes missing, the activities or stages of insider missions may not be detected in their natural temporal order. For example, the system may first detect internal botnets without knowing that employees' passwords have been compromised. In addition to ranking the likelihood for stages of potential insider missions, the methodology extends the framework of Most Relevant Explanation (MRE) (see Literature Reference No. 17) to rank mission scenarios, and recommend the investigation of missing or noisy observables. The methodology extends MRE to dynamic Bayesian networks for identifying, the proper number of variables and their temporal sequence in explaining soft evidence. The system further integrates MRE with a Value of Information (VOI) computation to recommend the investigation of missing or noisy observations. For example, the VOI computation is performed by taking the set of mission scenarios recommended by MRE as input and ranking observables according to their ability to differentiate those mission scenarios. Such capability will enable us to refute or strengthen the mission identification. FIG. 9 shows an example ranking of recommended observables to perform next.

Referring again to FIG. 5, the Probabilistic Mission Modeling Module 402 passes contextual cues 420 back to the Observation Extraction Module 400 and passes the reasoning results 422 to the Spectral EWS and Reactive Security Strategies modules. Contextual clues 420 would be other actions that these observables are related to (e.g., if the system has already observed one behavior—say gathering large quantity of information—then it may be desirable to cause the system to be more sensitive in the Observation Extraction Module 400 to monitoring network traffic or monitoring burning data to a CD-ROM, whereas those activities may be more benign if the other action had not occurred).

The reasoning results 422 are the computations of the likelihood that either complete or partially complete tasks have occurred. Such information is passed to the EWS module 404 and Reactive Security Strategies 406 (e.g., the reactive security strategies will respond and adapt based on the users' actions which the reasoning results are monitoring).

(4.3) Reactive Security Strategies Module

The Reactive Security Strategies Module 406 uses game-theoretic concepts for adaptive monitoring and response as well as automatically generated interactive decoys (honeypots) to make the masquerade exfiltration task difficult and risky, while having little effect on legitimate use of the network. Reactive policies are vital to achieve this goal, because many standard security precautions amount to perimeter defense, which is of no help against an insider threat; the security policies must change (with security policy updates 430), partially randomly, so that they are not avoidable even by users familiar with them. The solution is a sophisticated security framework that can interact with network users in a way that is neither damaging to productivity nor detectable by employees.

A component of the security policies provided according to the principles of the present invention is an adaptive monitoring and response system, employing game-theoretic concepts from recent literature (see Literature Reference Nos. 14 and 15). Interaction with a malicious insider is treated as a partisan game, in which the attacker's goal is to complete the masquerade exfiltration mission, while a goal of the present invention is to detect and identify the attacker before any significant damage is done. A diagrammatic representation of this game is created, considering the costs and benefits of each action for both players.

For instance, an observation of the insider passively monitoring network traffic is not directly observable, as it simply consists of the user storing, unauthorized data on the local hard drive. If this is taking place, and only network traffic is monitored, this neither gains nor costs the employer anything, but the attacker gains information. If instead, random hard drive audits are instituted, a small loss of productivity is incurred, with some estimable chance of detecting malicious activity. By quantifying the relative value of these benefits, it can be decided if and how frequently to audit hard disks on average, to maximize the gain. As changes are observed in the system, the model automatically adapts the cost/benefit analysis and suggests new security strategies. By observing the actions of network users in response, it can also be determined which users' actions are consistent with those of an insider.

As with security policies, the intranet itself can react to adversarial insiders. A honeypot is any network resource that is deliberately designed to be misused and exploited; for example, some work has been done in which game theory is used to create an interactive honeypot, which is designed to force an attacker to reveal as much information about himself as possible through his interaction with the system (see Literature Reference No 16). In other work, a "decoy document distributor" is described as automatically generating believable decoy files, which contain information that can be used to expose and identify the attacker (they are themselves honeypots) (see Literature Reference No. 8). The methodology of the present invention extends this by combining these two ideas to produce a honeypot that interacts credibly with a malicious user, simultaneously fabricating believable documents that will incriminate the insider possessing them.

(4.4) Spectral Early Warning Signals Module

To enable early detection, the present invention employs a unique model-free approach for detecting and predicting insider threats using a Spectral Early Warning Signals (Spectral EWS) module 404, which operates based on early warning signals for critical transitions in ecological systems (see Literature Reference No. 26). In doing so, the system interprets activities, observables, tells, dimensions, and constraints of a mission as comprising, a dynamical system. For example, normal missions may result in the access of folders or documents in certain patterns, which could be considered an attractor of a dynamical system, as opposed to another attractor manifesting adversary missions with different folder or document access patterns. Such complex systems may show certain early warning signals before going through critical transitions, i.e., the system goes through changes of switching from one stable state (normal mission) to another (adversary mission). Spectral EWS will detect and predict 432 such critical mission transitions by discerning the changes in a systems activities: observables, etc.

For detecting, and predicting insider masquerade exfiltration missions, the system first constructs the network of observables 424 (e.g., file directory is related to a person via their access usage, web sites are linked via URL, employees access certain web sites, and employees are associated via their e-mail contacts). The structure of the network may evolve over time (e.g., new e-mail contacts are added, new files are created, etc.). Next, a multi-dimensional activity energy space 426 (i.e., Cartesian product of file directory, web sites, employees, e-mail and time) is built to capture dynamic signals emitted from the network (e.g., Employee 1 access File 1 at time T1, Employee 1 send e-mail to Employee 2 with File attachment F1 at time T2, etc.)

Figure 10:
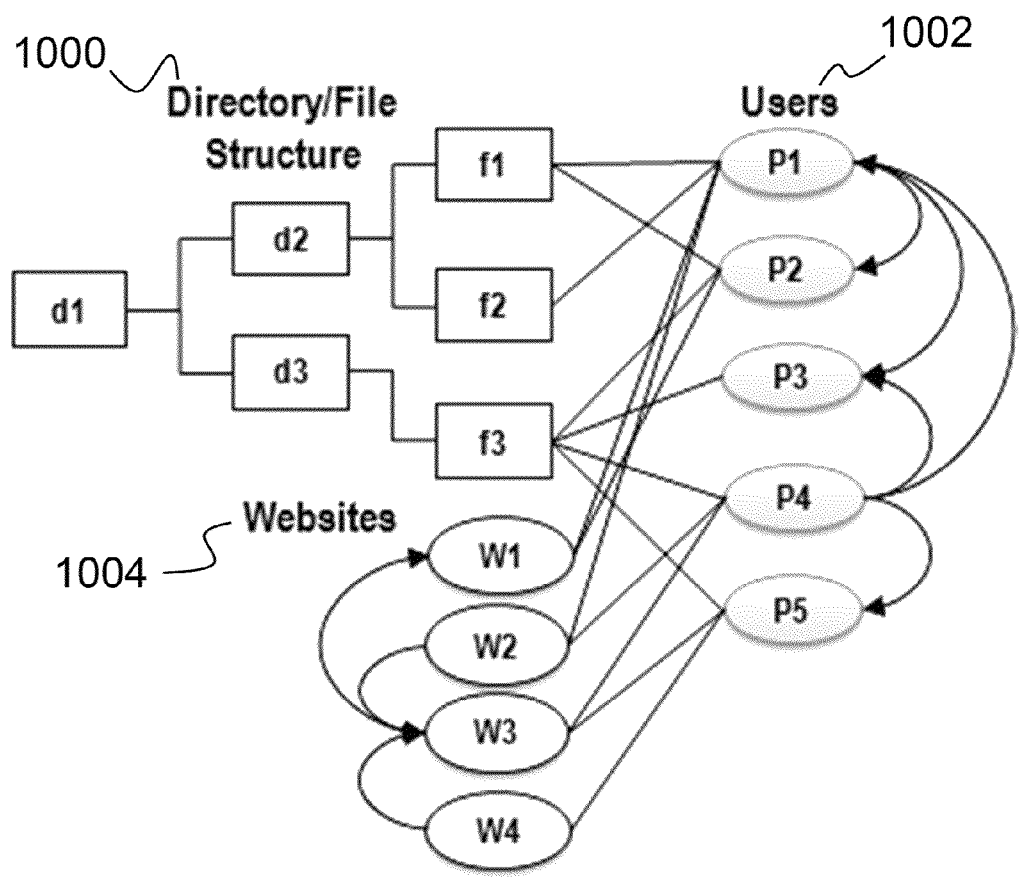
FIG. 10 is an illustration of an example network, showing relations between a file directory, users, and websites.

The source of such dynamical signals need to be extracted from either task-oriented log files (e.g., file directory access logs, web browsing logs, program execution logs, e-mail logs, etc.) or individual-oriented log files (e.g., user activity logs for one login session). The activity energy space 426 is the dynamical system in which normal missions and adversary missions are attractors in the system, and each mission has a trajectory in this dynamical system, FIG. 10 shows a schematic illustration of an example mission network, depicting relations between a file directory 1000, users 1002, and websites 1004. The structure of the network is evolving over time where nodes and edges can be added or removed. The dynamical system models the signals as information flows over the network.

Figure 11A:
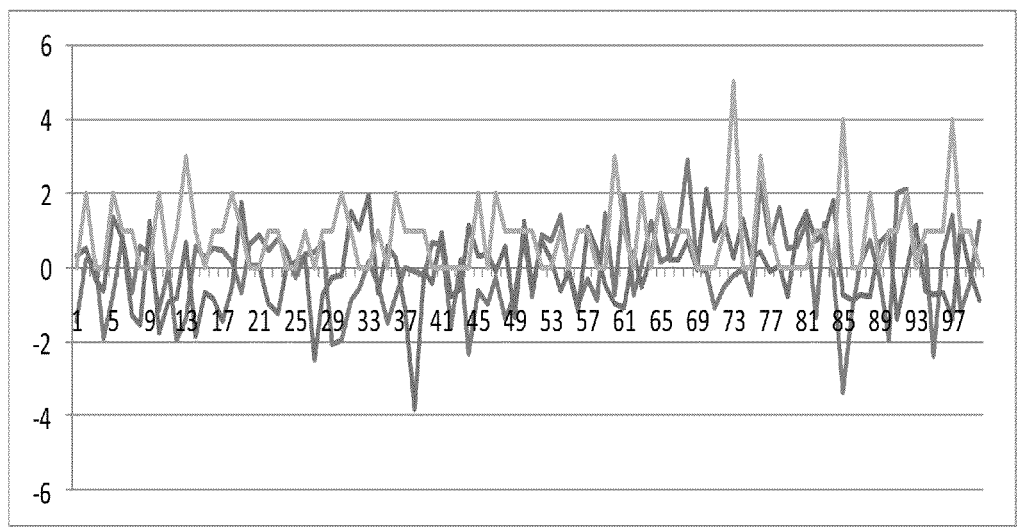
FIG. 11A is a chart illustrating temporal signals in an individual activity sequence.
Figure 11B:
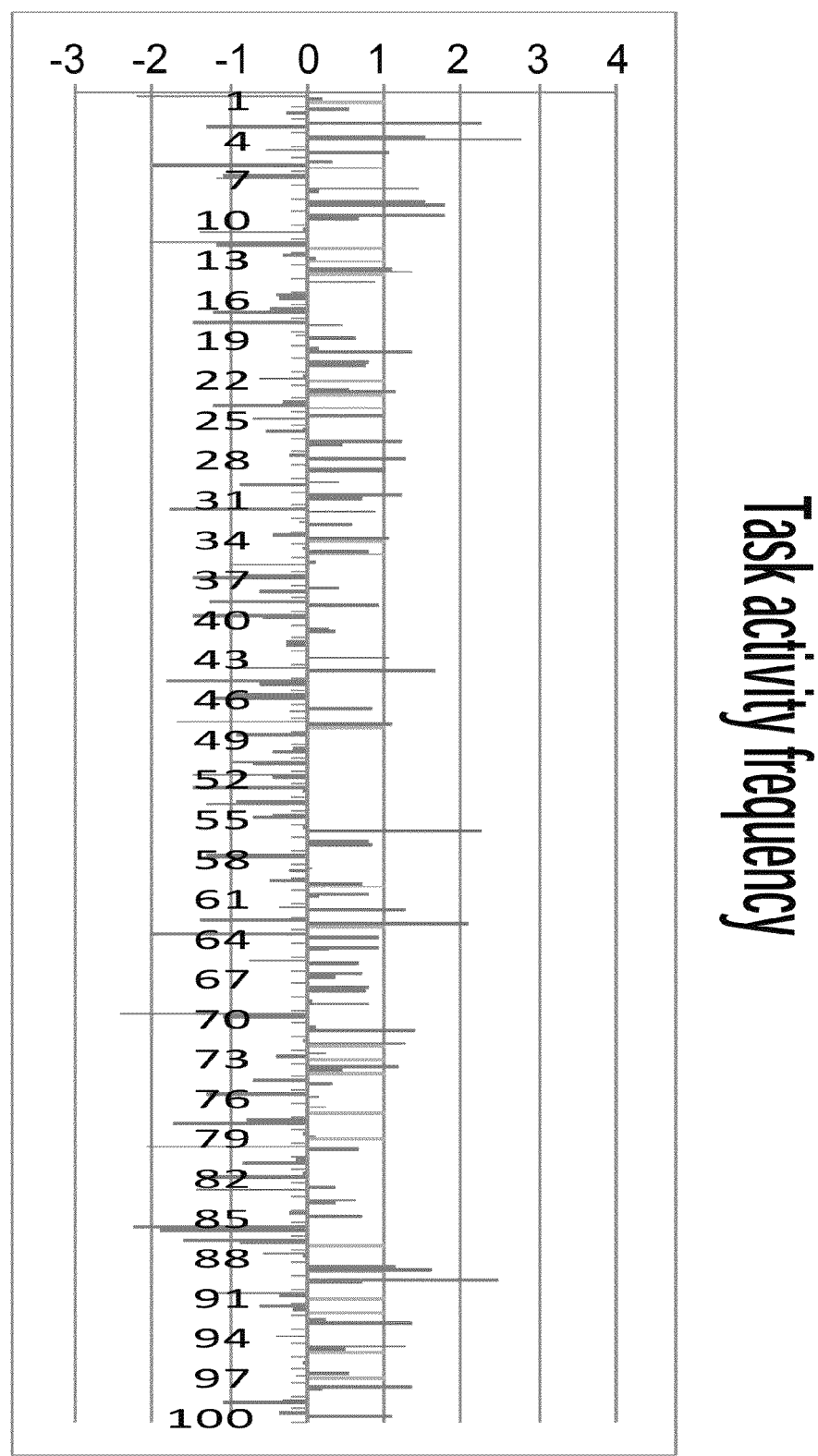
FIG. 11B is a chart illustrating temporal signals in a population activity sequence in which task activity frequency is shown.

Given the mission network one can construct temporal signals of an Individual Activity Sequence (as shown in FIG. 11A) to show individuals switching over tasks (e.g., accessing, a file, sending the file to another employee, etc.), or population activity (i.e., Task Activity Frequency as shown in FIG. 11B) to show activity frequency from all employees over time. In both FIGS. 11A and 11B, the charts illustrate lower dimensional signals projected from the activity energy space. In the Task Activity Frequency (FIG. 11B), the color of a bar represents the activity type, the height of a bar represents the number of employees performing the activity at a given time. In Individual Activity Sequence (FIG. 11A), each series represents the employee switching through different activities over time.

Such temporal signals can be extracted from task-oriented, or individual-oriented log files. The model-based approach, such as dynamic Bayesian networks (DBNs), aims to detect adversary missions from such temporal activity patterns. The model-free approach of the EWS module 404, on the other hand, works directly on the multiple temporal signals emitted from the mission network to reconstruct the phase space of activity energy using recurrent quantification analysis techniques (see Literature Reference No. 24). Spectral EWS is then applied to detect critical transitions as the insider starts switching from normal to adversary missions.

To address the complexity in detecting insider threats, the system according to the principles of the present invention considers multi-dimension control parameters and their interactions resulting from varying dynamics. A non-limiting example of a suitable technique for using control parameter in detecting critical transitions is described in "Early warning signal of complex systems: Network spectrum and critical transitions," in the *Workshop on Information in Networks (WIN)*, 2010 (see Literature Reference No. 2). For insider threat detection, Spectral EWS takes in observables of a mission and parameterize a network representation of observables using data embedding methods, such as Laplacian eigenmap (see Literature Reference No. 23). Laplacian eigenmap and its variants are known to provide a low-dimensional data representation to relational data that preserve local cluster structure. Spectral EWS then estimates mission trajectories using this representation in conjunction with the reconstructed phase space to infer the approaching of critical transitions.

Figure 12:
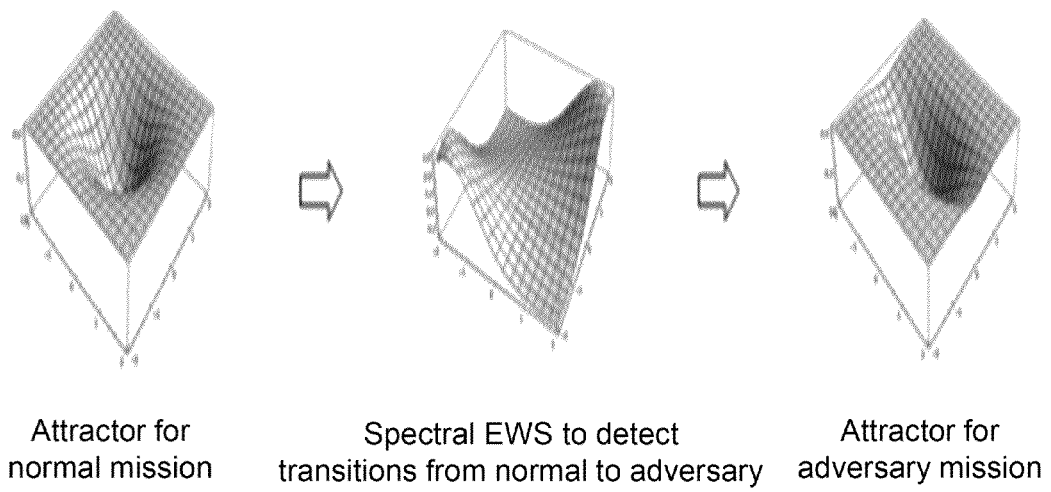
FIG. 12 is an illustration of activity energy space having multiple attractors in which some are normal and some are adversary, depicting the Spectral EWS as detecting transitions from normal to adversary as the mission travels on dynamically changing activity energy space.

The Spectral EWS Module 404 addresses the challenge of scale and time variances in information and process dynamics of adversary missions. Activities, observables, tells, and dimensions of a mission typically follow certain stationary patterns (information dynamics), whereas the execution of an adversary mission is likely to adhere to different non-stationary patterns (process dynamics). Conventional DBNs take the model-based approach and reasons upon pre-defined scenarios and operational constraints to piece together individual normal activities into a potential adversary mission. Spectral EWS, instead, takes a model-free approach and accounts for non-linear varying information and process dynamics to discern evolving hidden complex interactions in a mission landscape. For example. FIG. 12 provides an illustration of activity energy space having multiple attractors in which some are normal and some are adversary, depicting the Spectral EWS as detecting transitions from normal to adversary as the mission travels on dynamically changing activity energy space. Consequently, Spectral EWS can potentially enable the detection of sophisticated insider threats prior to the actual completion of an adversary's mission.

What is claimed is:

1. A system for detecting insider threats in a network, the system comprising:
one or more processors and a memory, the memory having executable instructions encoded thereon such that upon execution of the instructions the one or more processors perform operations of:
receiving data from the network relevant to network activity;
extracting observable actions from the data relevant to a mission;
combining the observable actions to provide contextual cues and reasoning results;
detecting potential insider threats through analyzing the observable actions and reasoning results;
generating, based on the observable actions and reasoning results, proposed security policy updates to force insiders into using more observable actions;
wherein in receiving the data from the network, the data is one or more data types selected from a group consisting of network packet headers, access log files, communications, and output of other security measures, or any combination thereof; and
wherein in extracting observable actions, hierarchical random graphs (HRGs) are used to cluster the data into normal patterns of activity and Bayesian Probabilistic Tensor decomposition (BPTD) is used to extract the observable actions from the patterns of activity.

2. The system as set forth in claim 1, wherein in combining the observable actions to provide contextual cues and reasoning results, the system uses dynamic Bayesian networks.

3. The system as set forth in claim 2, wherein in generating proposed security policy updates, the system uses game theoretic techniques to model interactions between potential insiders and current security policies to generate the proposed security policy updates.

4. The system as set forth in claim 2, wherein in detecting potential insider threats, the system uses Spectral Early Warning Signals to detect transitions between normal usage and exfiltration usage.

5. A computer program product for detecting insider threats in a network, the computer program product comprising computer-readable instructions stored on a non-transitory computer-readable medium that are executable by a computer having a processor for causing the processor to perform operations of:
receiving data from the network relevant to network activity;
extracting observable actions from the data relevant to a mission;
combining the observable actions to provide contextual cues and reasoning results;
detecting potential insider threats through analyzing the observable actions and reasoning results;
generating, based on the observable actions and reasoning results, proposed security policy updates to force insiders into using more observable actions;
wherein in receiving the data from the network, the data is one or more data types selected from a group consisting of network packet headers, access log files, communications, and output of other security measures, or any combination thereof, and
wherein in extracting observable actions, hierarchical random graphs (HRGs) are used to cluster the data into normal patterns of activity and Bayesian Probabilistic Tensor decomposition (BPTD) is used to extract the observable actions from the patterns of activity.

6. The computer program product as set forth in claim 5, wherein in combining the observable actions to provide contextual cues and reasoning results, dynamic Bayesian networks are used.

7. The computer program product as set forth in claim 6, wherein in generating proposed security policy updates, game theoretic techniques are used to model interactions between potential insiders and current security policies to generate the proposed security policy updates.

8. The computer program product as set forth in claim 6, wherein in detecting potential insider threats, Spectral Early Warning Signals are used to detect transitions between normal usage and exfiltration usage.

9. A computer implemented method for detecting insider threats in a network, the method comprising an act of causing one or more processors to execute instructions encoded on a non-transitory computer-readable medium, such that upon execution of the instructions, the one or more processors perform operations of:
receiving data from the network relevant to network activity;
extracting observable actions from the data relevant to a mission;
combining the observable actions to provide contextual cues and reasoning results;
detecting potential insider threats through analyzing the observable actions and reasoning results;
generating based on the observable actions and reasoning results proposed security policy updates to force insiders into using more observable actions;
wherein in receiving the data from the network, the data is one or more data types selected from a group consisting of network packet headers, access log files, communications, and output of other security measures, or any combination thereof; and
wherein in extracting observable actions, hierarchical random graphs (HRGs) are used to cluster the data into normal patterns of activity and Bayesian Probabilistic Tensor decomposition (BPTD) is used to extract the observable actions from the patterns of activity.

10. The method as set forth in claim 9, wherein in combining the observable actions to provide contextual cues and reasoning results, dynamic Bayesian networks are used.

11. The method as set forth in claim 10, wherein in generating proposed security policy updates, game theoretic techniques are used to model interactions between potential insiders and current security policies to generate the proposed security policy updates.

12. The method as set forth in claim 10, wherein in detecting potential insider threats, Spectral Early Warning Signals are used to detect transitions between normal usage and exfiltration usage.

* * * * *